United States Patent [19]

Tanagawa et al.

[11] Patent Number: 4,636,945
[45] Date of Patent: Jan. 13, 1987

[54] MICROPROCESSOR

[75] Inventors: Koji Tanagawa; Isao Ohashi, both of Tokyo, Japan

[73] Assignee: Oki Electric Industry Co., Ltd., Tokyo, Japan

[21] Appl. No.: 506,195

[22] Filed: Jun. 20, 1983

[30] Foreign Application Priority Data

Jun. 23, 1982 [JP] Japan .................................. 57-106768

[51] Int. Cl.$^4$ .............................................. G06F 9/30
[52] U.S. Cl. ................................................... 364/200
[58] Field of Search ........................ 364/200 MS File

[56] References Cited

U.S. PATENT DOCUMENTS 4,482,953 11/1984 Burke .................................. 364/200

Primary Examiner—James R. Hoffman
Attorney, Agent, or Firm—Wenderoth, Lind & Ponack

[57] ABSTRACT

In a microprocessor including a data memory device a simple checking circuit is provided for reading out the data onto a data bus line to check whether the data must be debugged. The checking circuit reads out data stored in an accumulator, register, etc. onto the data bus line. The checking circuit allows the microprocessor to operate normally in the absence of a checking signal and respectively connects the accumulator, register, or RAM outputs to the data bus in accordance with the timing signals from the microprocessor timing signal generator in the presence of the checking signal. A program counter of the microprocessor is also inhibited from incrementing when the checking signal is present.

1 Claim, 2 Drawing Figures

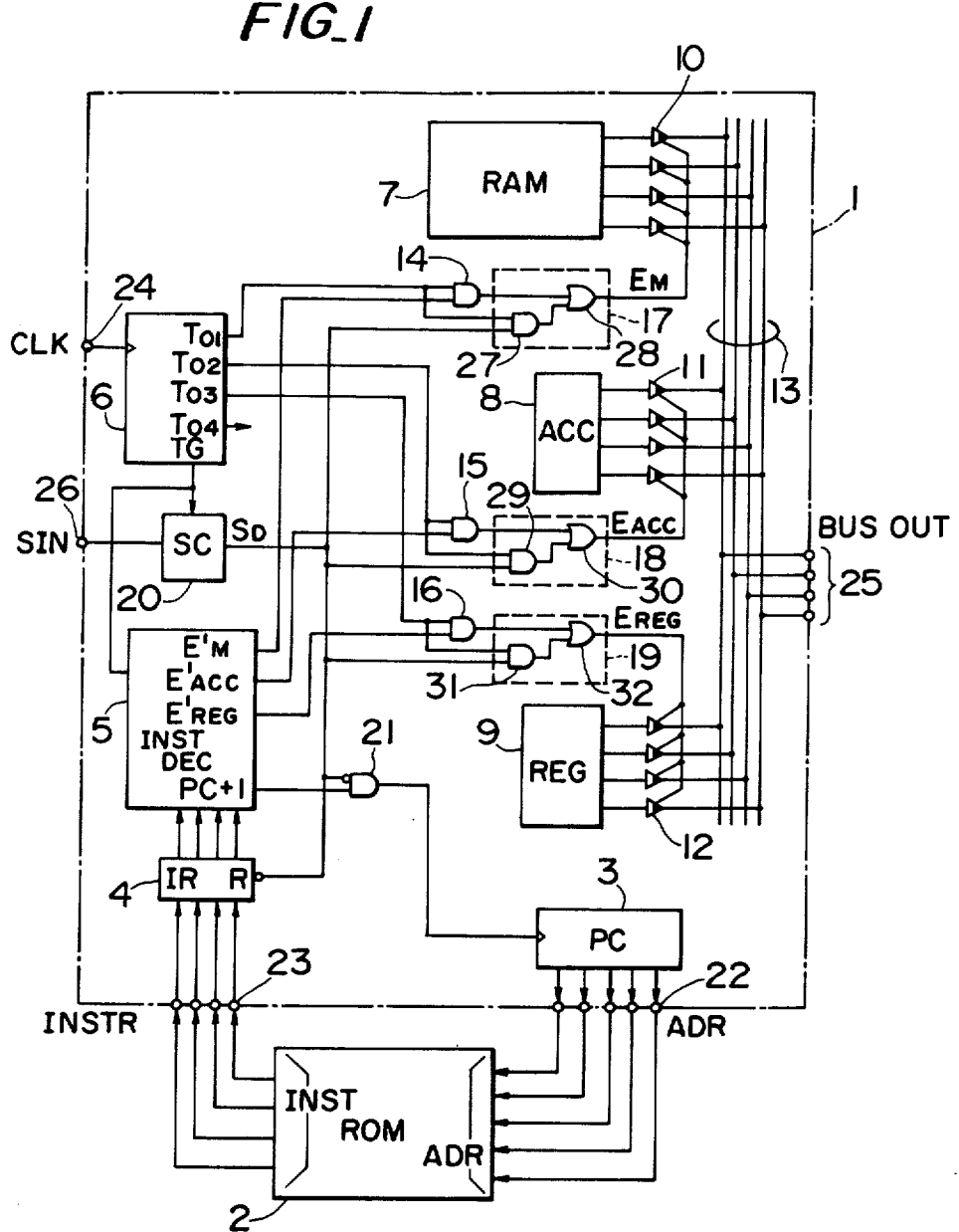
FIG_1

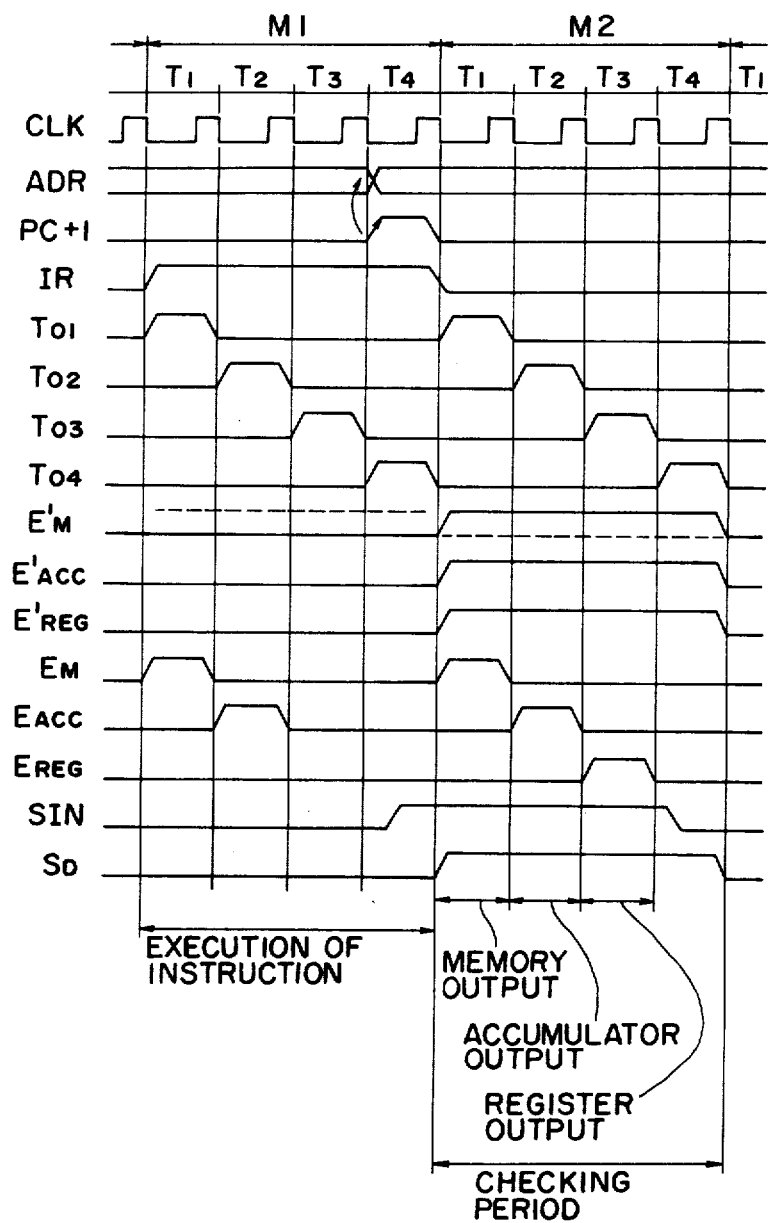

MICROPROCESSOR

BACKGROUND OF THE INVENTION

This invention relates to a microprocessor including a checking circuit capable of testing in a short time a program stored in a semiconductor memory device to check whether the program must be debugged.

In order to efficiently utilize a computer it is essential to prepare suitable software, that is, a program. Even with the highly developed electronic technology presently in use today, it is difficult to automate the development of a program. Thus, it still it requires much time and labor to prepare a program.

The same is true for the development of software for use in a microcomputer fabricated with semiconductor integrated circuits. More particularly, since it requires much time for debugging a program, a long period is necessary for designing and manufacturing hardware, especially in the case of a microcomputer (including a microprocessor).

For efficiently debugging a program prepared for use in a microcomputer, after executing an instruction, it is necessary to read out and confirm the content of a register (including a memory device, flag, etc.) in a central processing unit (CPU). Moreover, in order to correctly execute the next instruction step, care should be taken not to change the internal state of the CPU such as a register, a program counter, an instruction register, etc., contained in the CPU during the checking.

Although there are many methods of checking a microcomputer program, according to a so-called single step method, the actual operation states of the hardware are sequentially checked at each step of an instruction. More particularly, according to this method, each time an instruction is executed, the operation of the CPU (i.e., microprocessor) is stopped and the contents of a memory device, an accumulator, various registers or the like contained in the CPU are displayed so as to check whether or not the contemplated program is operating correctly.

With this checking method, however, there is a defect in that the contents of only some of the registers can be confirmed external to the microprocessor. Although this difficulty can be overcome by providing exclusive input/output terminals connected to all of the registers in the microprocessor, this is not practical because of the limitations caused by the number of pins of a standardized package or the chip size.

SUMMARY OF THE INVENTION

Accordingly, it is an object of this invention to provide an improved microprocessor having a checking circuit capable of testing a program in a short time.

Another object of this invention is to provide an improved microprocessor capable of readily checking a program without an undue increase in the number of hardware elements.

Still another object of this invention is to provide a novel microprocessor in which the states of the internal circuits thereof are not caused to change during checking.

According to this invention there is provided a microprocessor comprising: a memory circuit for storing a program; a timing signal generator for generating a timing signal; a synchronizing circuit, which, in response to a checking signal for testing the program, produces a control signal which is synchronous with the timing signal; a program counter; a fist gate circuit for inhibiting an increment of said program counter in accordance with the control signal; an instruction register reset by said control signal; a register for storing data, and a second gate circuit for outputting the program stored in the memory device onto a bus line in accordance with the control circuit.

By adding suitable gate circuits, the contents of an accumulator, registers, etc., usually provided for a microcomputer, can also be checked.

BRIEF DESCRIPTION OF THE DRAWINGS

In the accompanying drawings:

FIG. 1 is a block diagram showing one embodiment of the microprocessor according to this invention; and FIG. 2 is a timing chart useful to explain the operation of the microprocessor shown in FIG. 1.

DESCRIPTION OF THE PREFERRED EMBODIMENT

Referring now to FIG. 1, a 4 bit microcomputer is constituted by a microprocessor 1 generally made up of MOS transistors, and a read only memory device (ROM) 2 for storing a program.

The microprocessor 1 comprises a program counter (PC) 3, an instruction register (IR) 4, an instruction decoder (INST DEC) 5, a timing signal generator 6, a data memory device (RAM) 7, an accumulator (ACC) 8, a register (REG) 9, output gate circuits 10, 11 and 12, data bus lines 13 and AND gate circuits 14, 15 and 16. The microprocessor 1 further comprises a checking circuit including gate circuits 17, 18 and 19, a synchronizing circuit (SC) 20, and a gate circuit 21.

The output terminals of the program counter 3 are connected to the address input terminals of the ROM 2 via address signal output terminals 22 so as to designate instruction addresses of the ROM 2 in accordance with code signals outputted from the counter 3. The register 4 takes the form of an instruction register provided with a reset terminal R and its input terminals are connected to the instruction output terminals INST of the ROM 2 via instruction input terminals 23 so as to temporarily store instruction code signals outputted from ROM 2. The signal input terminals of the instruction decoder 5 are connected to the output terminals of the instruction register 4. Accordingly, the decoder 5 decodes instructions from the register 4 and then supplies control signals $E'_M$, $E'_{ACC}$, $E'_{REG}$ and (PC+1) (an increment signal) to respective gate circuits. In response to a clock signal CLK inputted to a reference clock signal input terminal 24, the timing signal generator 6 supplies various timing signals $T_{01}$, $T_{02}$, $T_{03}$ and $T_{04}$ to various circuit elements of the microprocessor 1. The bit lines of the data bus lines 13 are respectively connected to data bus output terminals 25 and to output terminals of output gate circuits 10, 11 and 12 respectively. The output terminals of the RAM 7 (data memory device) are selectively connected to the data bus lines 13 via output gate circuit 10. The output terminals of the accumulator 8 and of the register 9 are selectively connected to the bus lines 13 through output gate circuits 11 and 12 respectively. Three AND gate circuits 14, 15 and 16 respectively acting as control gate circuits output enable signals $E_M$, $E_{ACC}$ and $E_{REG}$ in accordance with control signals $E'_M$, $E'_{ACC}$ and $E'_{REG}$ from the instruction register 5, which are in synchronism with timing signals $T_{01}$, $T_{02}$ and $T_{03}$ generated by the timing signal generator 6.

The signal input terminal of the synchronizing circuit 20 is connected to signal input terminal 26, while its signal output terminal is connected to the reset terminal R of the instruction register 4 for producing a control signal $S_D$ synchronous with the timing signal generated by the timing signal generator 6. To the signal terminal 26 is applied a checking signal for testing a program stored in the ROM 2.

Two input terminals of the AND gate circuit 21 are respectively connected to the increment signal output terminal of the instruction decoder 5 and the output terminal of the synchronizing circuit 20, while the output of the AND gate circuit 21 is supplied to the program counter 3. As a consequence, when the control signal $S_D$ is applied to one input terminal of the AND gate circuit 21 from the synchronizing circuit 20, it inhibits the increment signal (PC+1) from being supplied to the program counter 3. The gate circuit 17 is constituted by an AND gate circuit 27 and an OR gate circuit 28. The two input terminals of the AND gate circuit 27 are connected so as to receive a timing signal $T_{01}$ generated by the timing signal generator 6 and the control signal $S_D$ produced by the synchronizing circuit 20. The input terminals of the OR gate circuit 28 are connected to the output terminals of AND gate circuits 14 and 27 respectively, while the output terminal of the OR gate circuit 28 is connected to the control terminals of the output gate circuit 10. The gate circuit 18 is constituted by an AND gate circuit 29 and an OR gate circuit 30. The two input terminals of the AND gate circuit 29 are supplied with the timing signal $T_{02}$ generated by the timing signal generator 6 and the output of the synchronizing circuit 20 and the two input terminals of the OR gate circuit 30 are connected so as to receive the outputs of the AND gate circuits 15 and 29 respectively, while the output terminal of the OR gate circuit 30 is connected to the control terminals of the gate circuit 11. The gate circuit 19 is constituted by an AND gate circuit 31 and an OR gate circuit 32. The two input terminals of the AND gate circuit 31 are supplied with the timing signal $T_{03}$ generated by the timing signal generator 6 and the output of the synchronizing circuit 20. The two input terminals of the OR gate circuit 32 are supplied with the output signals of the AND gate circuits 16 and 31, while the output of the OR gate circuit 32 is supplied to the control terminals of the output gate circuits 12.

The operation of the embodiment shown in FIG. 1 will now be described with reference to the timing chart shown in FIG. 2.

A reference clock signal CLK is applied to the reference clock signal input terminal 24 and the timing signal generator 6 produces timing signals $T_{01}$-$T_{04}$ in the timing states $T_1$-$T_4$ of respective operating cycles M1, M2, . . . .

When the checking signal SIN supplied to the signal terminal 26 is a logic "0", the microprocessor 1 operates normally as the microcomputer according to an instruction supplied from the ROM 2. More particularly, at the timing state $T_1$ of the operating cycle M1 shown in FIG. 2, the instruction code from the ROM 2 is latched in the instruction register 4 and the instruction decoder 5 decodes the instruction code to select predetermined circuit elements of the microprocessor 1 for outputting their output data onto the data bus lines 13. For example, when the control signal $E'_M$ outputted by the instruction decoder 5 becomes a logic "1" (the waveform shown by dotted lines of the waveform $E'_M$ shown in FIG. 2), the enable signal $E_M$ outputted by the OR gate circuit 28 becomes a logic "1" to enable the output gate circuit 10 to read out the data stored in RAM 7 onto the data bus lines 13.

In the same manner, when the control signal $E'_{ACC}$ or $E'_{REG}$ produced by the instruction decoder 5 becomes a logic "1", the accumulator 8 or register 9 is selected and their contents are selectively outputted onto the data bus lines 13.

At state $T_4$, since the instruction decoder 5 outputs the increment signal (PC+1), the content of the program counter 3 would be incremented by 1 for producing the next instruction from the ROM 2.

When an external checking signal SIN of a logic "1" level is applied to the signal terminal 26 during the operating cycle M2 as shown in FIG. 2, the operation is transferred to a mode of testing or checking the program stored in the ROM 2. While the checking signal is being inputted to the signal input terminal 26, the control signal $S_D$ outputted by the synchronizing circuit 20 becomes "1" with the result that the AND gate circuits 27, 29 and 31 successively change the outputs of the OR gate circuits 28, 30 and 32 to a logic "1" in synchronism with the respective timing signals generated by the timing signal generator 6. Consequently, the gate circuits 10, 11 and 12 will be successively enabled to sequentially read out the contents of RAM 7, accumulator 8 and the register 9 onto the data bus lines 13 so that the operating states of these elements can be checked by the outputs appearing at the output terminals 25 of the data bus lines 25.

Since the control signal $S_D$ outputted by the synchronizing circuit 20 resets the instruction register 4, a "no operation" instruction (NOP instruction) is executed regardless of an instruction outputted from ROM 2. The NOP instruction means an instruction for no operation so that the states in the processor do not change.

The gate circuit 21 produces a signal inhibiting the incrementing operation of the program counter 3 in accordance with the control signal $S_D$ outputted by the synchronizing circuit 20 and the increment signal (PC+1) outputted from the instruction decoder 5 so that the content of the program counter 3 would not be changed.

Consequently, the contents of the memory device, the register and the other elements of the microprocessor can be sequentially read out on the data bus output terminals.

To execute the next instruction, the checking signal applied to the signal terminal 26 is removed. Then, the synchronizing circuit 20 does not produce control signal $S_D$ so that the instruction from the ROM 2 is latched by the instruction register 4 and the increment signal (PC+1) from the instruction decoder 5 increments by one count the program counter 3, whereby the normal operation of the microprocessor 1 acting as a microcomputer is resumed for executing consecutive programs.

As above described, since the microprocessor of this invention is provided with a checking circuit the contents of the elements in the microprocessor are read out to the output terminals of the data bus lines thereby efficiently checking the program.

Furthermore, according to this invention the contents of the circuit elements are not changed during the checking operation; upon completion of one instruction, the next instruction can be at once be executed.

Moreover, as the output signals of various circuit elements are sequentially outputted to the data bus lines no special output terminal is needed for checking.

Although in the foregoing embodiment a microprocessor was used, it can be replaced by a single chip microcomputer.

According to this invention, since the program can be checked in a short time, the debugging operation can be made simply according to the result of the check, thus simplifying the design and application of a microcomputer.

What is claimed is:

1. In a microprocessor comprising:
   a data bus line;
   a register operatively connected to said data bus line via a plurality of first output gates, said register temporarily storing data therein;
   an accumulator operatively connected to said data bus line via a plurality of second output gates, said accumulator storing data therein;
   a random access memory operatively connected to said data bus line via a plurality of third output gates, said random access memory storing data therein;
   a timing signal generator means operatively connected to said pluralities of first and second and third output gates for controlling the operation thereof in response to clock signals input to said timing signal generator;
   an instruction decoder operatively connected to said pluralities of first and second and third output gates for controlling the operation thereof;
   a program counter operatively connected to said instruction decoder for providing an address output which is incremented by a signal from said instruction decoder;
   an external read only memory operatively connected to said program counter for receiving said address output therefrom and generating an instruction output in response thereto;
   an instruction register operatively connected to said external read only memory for receiving said instruction output therefrom and generating an instruction signal which is input to said instruction decoder, said instruction decoder providing outputs for controlling said pluralities of first and second and third output gates and said program counter in response to said output of said instruction register and a timing signal output from said timing signal generator;

the improvement comprising:
   a synchronizing circuit operatively connected to said timing signal generator for producing a control signal which is synchronous with a timing signal from said timing signal generator when an external checking signal is inputted thereto;
   and first and second and third gate circuits respectively operatively connected between said plurality of first and second and third output gates and said instruction decoder and timing signal generator and controlled by said control signal so as to selectively inhibit said pluralities of first and second and third output gates in response to said control signal;
   and a second gate circuit operatively connected between said instruction decoder and program counter for inhibiting incrementing of said program counter by a signal from said instruction decoder;
   wherein said microprocessor operates normally in the absence of said external checking signal and selectively outputs data stored in said register and accumulator and random access memory to said data bus in response to timing signals output from said timing signal generator when said external checking signal is present.

* * * * *